Figure 1:
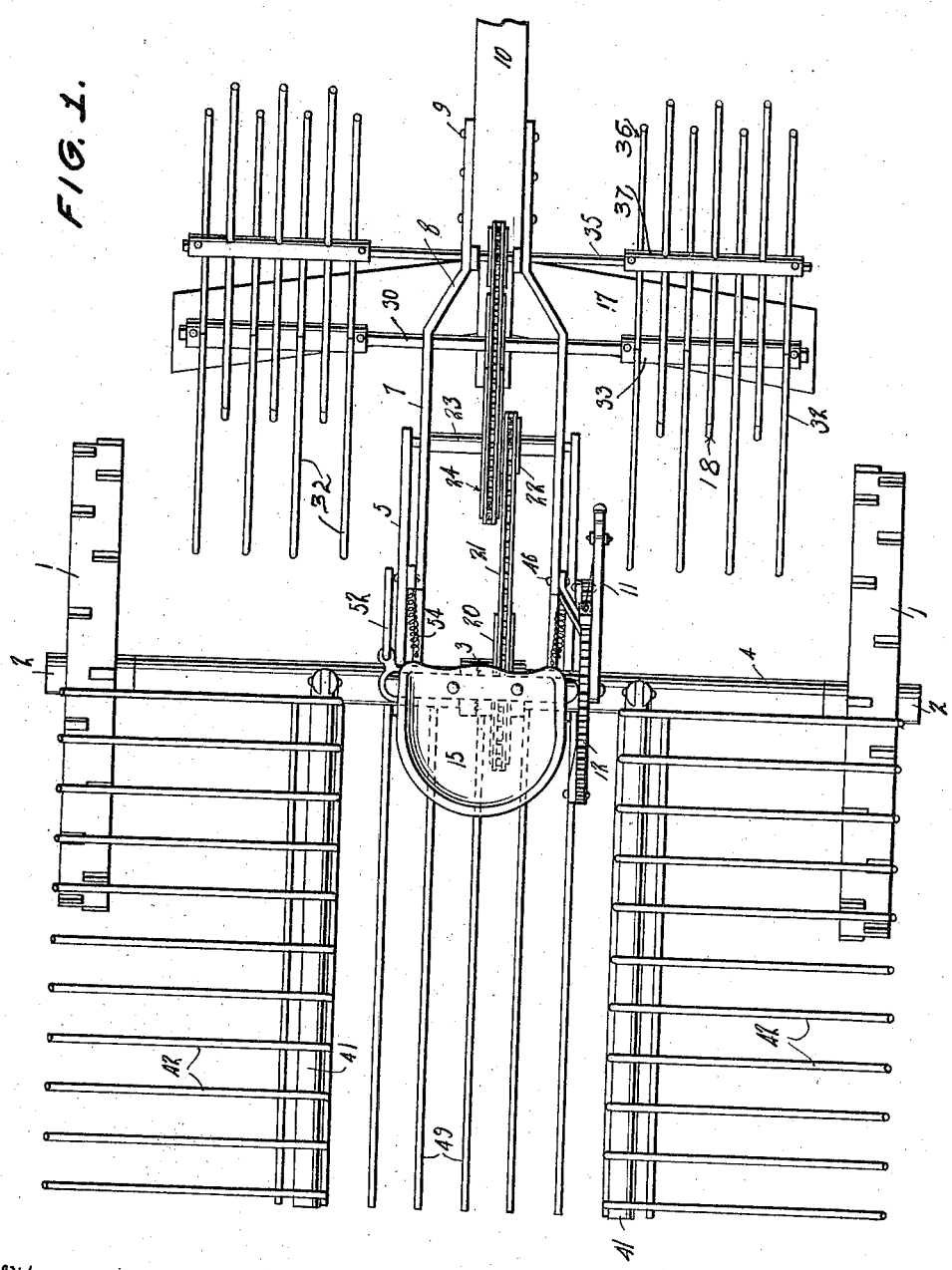

J. O. NOAH.
PEANUT DIGGER.
APPLICATION FILED JUNE 19, 1918.

1,300,636.

Patented Apr. 15, 1919.
3 SHEETS—SHEET 1.

Witnesses
W. C. Fielding

Inventor
Joseph O. Noah
By Richard B. Owen
Attorney

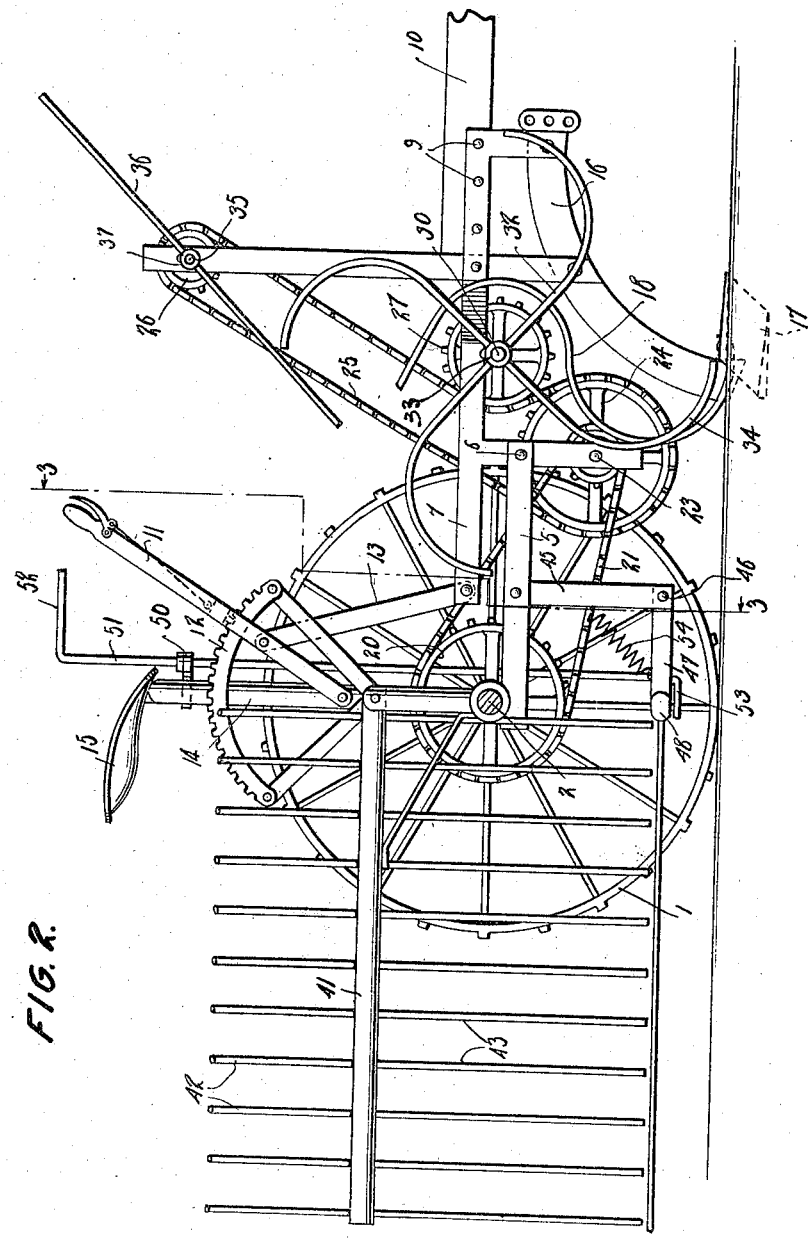

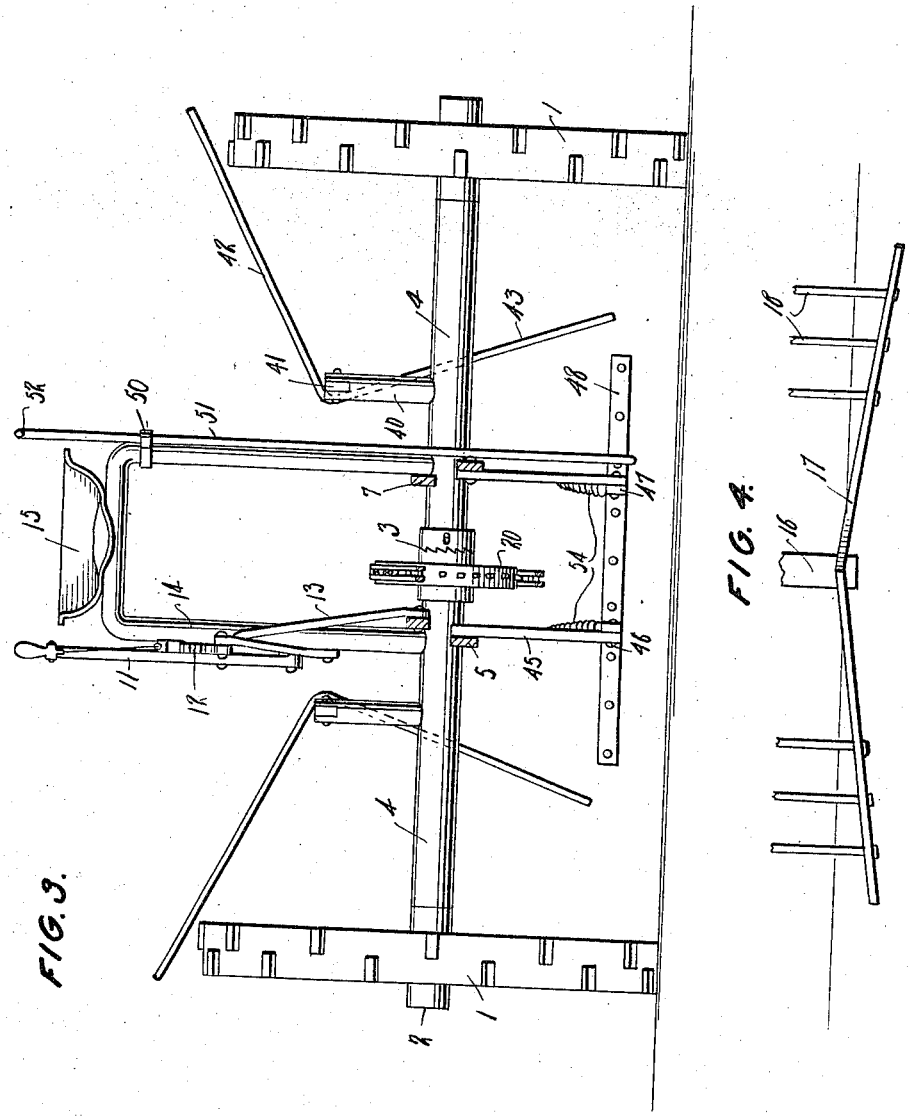

UNITED STATES PATENT OFFICE.

JOSEPH O. NOAH, OF LINGLEVILLE, TEXAS.

PEANUT-DIGGER.

1,300,636.  Specification of Letters Patent.  Patented Apr. 15, 1919.

Application filed June 19, 1918. Serial No. 240,790.

*To all whom it may concern:*

Be it known that I, JOSEPH O. NOAH, a citizen of the United States, residing at Lingleville, in the county of Erath and State of Texas, have invented certain new and useful Improvements in Peanut-Diggers, of which the following is a specification.

This invention relates to harvesters, and more especially to stalk-cutters; and the object of the same is to produce a simple machine which will sever the stalks of the peanut vines at a point just below the ground, will remove the dirt from them, and will deliver them into a basket where they will accumulate in a pile to be dumped from time to time.

This object is accomplished by instrumentalities described in detail in the following specification and claims, and shown in the drawings wherein:—

Figure 1 is a plan view of this machine complete,

Fig. 2 a side elevation thereof with the nearer wheel removed,

Fig. 3 a section on line 3—3 of Fig. 2, and

Fig. 4 a detail of the knife in elevation.

Two main wheels 1 are fast respectively on a two-part axle 2 whose parts are connected by suitable ratchet mechanism as shown at 3 in Fig. 3 and are otherwise surrounded by an axle casing 4 which alone supports the elements yet to be described. Parallel horizontal frame bars 5 extend forward from said casing, and to their front ends at 6 are pivoted T-shaped frames 7 whose front ends converge as seen at 8 and are attached at 9 to a tongue 10 (Fig. 1) to which the draft is applied. The driven shafts are carried by the T-shaped frames and these are capable of adjustment around their supporting pivots 6 by means of a handle 11 moving over a toothed sector 12 and a link 13 connecting the handle with the frame. Said sector is carried on a support 14 as best seen in Fig. 3 and the operator's seat is indicated at 15. Its position is directly behind the team, and the mechanisms hereinafter described are at opposite sides of the central line of the machine, so that while the vines are tossed rearward as yet to be explained they pass the operator without doing him injury. I may say at this point that the machine as herein shown is designed to treat two rows of peanut bushes simultaneously, but it is quite obvious that if it be driven alongside the last row treated it may be so guided that only one row will be handled at each passage of the machine. Also it is quite obvious that the mechanism need not be duplicated at opposite sides of the center line, in which case the machine will be a one-row peanut digger as will be clear. Attention is also invited to the fact that the main wheels 1 are shown in Fig. 1 as spaced wide enough apart to straddle the two rows completely, which of course would be the case if it were a two-row machine. The front ends of the frame members 7 may well be turned down as seen in Fig. 2 so as to support a standard 16 curved rearward and downward as there illustrated, and the lower end of the standard carries a knife 17 whose shape is best seen in Fig. 4. There it will be observed that the center of this knife is higher than either end, traveling just a little above the ground, and from this point the two arms of the knife incline downward and rearward, their outer ends cutting perhaps four inches under the earth. From said knife near its ends rise three rods constituting rake teeth 18, each rod being given a double bend as perhaps best seen in Fig. 2. When the cutting edge of the knife severs the stalk beneath the ground, its butt slides rearward over the knife blade and its top is caught up in the lower bend of the several rake teeth for treatment in a manner yet to be explained.

One part of the axle 2 carries a driving sprocket 20 from which a chain belt 21 leads forward to a smaller sprocket 22 on a counter shaft 23. This shaft in turn carries a large sprocket 24 from which a belt 25 leads upward around another sprocket 26. Thus the speed of rotation is increased from the main axle to the countershaft and from the countershaft to the shaft of the small sprocket, and all sprockets thus far mentioned are rotating in one direction. The belt 25 passes behind another sprocket 27 which has twice as many teeth as the higher sprocket 26, and therefore this sprocket 27 is compelled to rotate in the reverse direction and at half the speed.

The picker reels are mounted on the extremities of a shaft 30 which is fast in the sprocket 27. There are two of these reels as seen in Fig. 1 and each is composed of eight long fingers 32 of S-shape, each finger at its mid-length passing through the hub 33 which forms the center of the reel and having its curve 34 so disposed as practically to parallel the curve of the rake teeth 18 between which it passes. By this I mean to say that if there are three rake teeth there will be four fingers, although the number might be increased or decreased. It will be observed that the upper curve of the rake teeth 18 (see Fig. 2) is such that it incloses the hub 33 of the picker reel and extends well over the same.

The tosser reels are likewise mounted on the extremities of a shaft 35 which is fast through the high and small sprocket 26 which it will be remembered is revolving in the opposite direction to and twice as fast as the sprocket 27. The fingers 36 of this reel may well be straight rods fixed at their midlength through the hub 37 so that each rod constitutes two fingers. Here again there will be three fingers if there are three rake teeth in each group, and the length of the fingers 36 is such that they stand well above the teeth of the rakes as seen in Fig. 2. Also the rotation is timed so that they move to the rear much more rapidly than the upper fingers of the picker reel.

With this construction, the vines cut by the knife 17 fall into the lower bends of the teeth of the rake, next the fingers of the picker reel move forward through these bends and carry the vines upward and forward, and just as they reach the top of the picker reel the fingers of the tosser reel strike the vines and toss them to the rear on opposite sides of the operator sitting on the seat as mentioned above. Therefore it will be seen that the dirt picked up by the vines is well threshed out of the same before they are tossed into the basket yet to be described. The cutting ends of the knife should be set to cut the tap root of the vines and leave the nitrogen bearing nodules in the ground where they are serviceable as fertilizer.

Standards 40 rising from the axle casing 4 carry rearwardly extending bars 41, each of which in turn carries a number of downwardly and inwardly inclined fingers 42. These may be set at an angle where they pass over the bar and may have pendant stretches 43. From the frame bars 5 depend hangers 45 to which at 46 are pivoted arms 47 extending forward from a cross head 48 which carries a number of tines 49 extending straight to the rear; and these, with the pendant stretches 43 of the fingers 42, constitute a basket for receiving the vines thrown to the rear by the tosser reels. Mounted in bearings 50 on one of the supports is an upright shaft 51 having a handle 52 at its upper end and a right angular hook 53 at its lower end, the hook standing in position to turn under the cross head 48 as seen in Fig. 2 at a time when the tines 49 stand horizontal. When this basket is empty, the cross head is raised, for such engagement of the hook 53, by means of springs 54 whose strength is sufficient to raise the tines when the basket is empty. By this construction the vines tossed to the rear by the fingers 36 fall on the fingers 42 and slide from them onto the tines 49, where they accumulate in a pile which is deeper at the center than at the sides, and from which they cannot fall off because they are restrained by the stretches 43. From time to time the operator manipulates the handle 52 to turn the hook 53 out from under the cross head 48, and the weight of the pile of vines will cause the basket to dump so that the vines, reaching through the tines rest on the earth and the tines are drawn out from under them. Immediately the springs 54 react to raise the cross head, and the operator swings the hook 54 again under it to support it in position as shown in Fig. 2 until a new pile has accumulated thereon.

Thus is produced a machine wherein the plants are cut by the knife at a proper point beneath the earth's surface, the vines fall into the bend at the lower part of the rake, then the picker reel picks them out of this bend and carries them up over its own shaft, and immediately the tosser reel knocks them out of the picker reel and throws them onto the fingers 42, whence they slide into a pile on the basket, from which they are dumped from time to time. All rotating parts are driven through the counter shaft from one sprocket wheel on the main shaft; the height of the knife is controlled by one lever, and the dumping of the basket by another. The machine is extremely simple, and while I have constructed it with the intention of harvesting peanuts, I do not wish to be confined to that use of the machine as it might be otherwise employed.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a machine of the type described, the combination with a framework mounted on wheels, and a series of rake teeth carried by said framework, of a picker reel having fingers moving between said rake teeth in one direction, a tosser reel having fingers moving between the fingers of the picker reel in the opposite direction, and driving connections between the reels and said wheels.

2. In a machine of the type described, the combination with a framework mounted on wheels, gathering means at the front end of the framework; and curved rake teeth carried by the framework and into which the gathered vines collect; of a picker reel having fingers moving between the rake teeth in one direction, a tosser reel disposed above the picker reel and having fingers moving between those of the picker reel in the opposite direction and at greater speed, and driving connections between the shafts of said reels and one of the main wheels.

3. In a machine of the type described, the combination with a main framework mounted on wheels, gathering mechanism at the front end of the same, and a series of curved rake teeth into which the gathered vines collect; of a rotary picker reel for taking the vines from the rake teeth, a rotary tosser reel for taking the vines from the picker reel and delivering them to the rear, and driving connections between the shafts of said reels and one of the main wheels.

4. In a machine of the type described, the combination with a framework mounted on wheels, a standard carried by the framework, a knife connected at its center with the lower end of said standard and having two downwardly and rearwardly diverging arms, and a series of rake teeth extending from each arm and bent first to the rear and then to the front; of a picker reel having fingers moving through said rake teeth in one direction for taking the vines therefrom, and a tosser reel having fingers moving through those of the picker reel in the opposite direction and at greater speed for taking the vines from the picker reel, for the purpose set forth.

5. In a peanut digger, the combination with a framework mounted on wheels, a standard carried by the framework, a knife connected at its center with the lower end of said standard and having two downwardly and rearwardly diverging arms, and a series of rake teeth extending upward from each arm; of a picker reel disposed above said knife and having its lower fingers passing forwardly between the rake teeth for taking the vines therefrom, a tosser reel disposed above said picker reel and having its fingers moving through the fingers at the top of the picker reel for taking the vines from said picker reel, and connections between the shafts of both reels and one of said main reels.

In testimony whereof I affix my signature in presence of two witnesses.

JOSEPH O. NOAH.

Witnesses:
W. B. HILLIARD,
FRANK HOLLAND.

Copies of this patent may be obtained for five cents each, by addressing the "Commissioner of Patents, Washington, D. C."